United States Patent Office 3,223,747
Patented Dec. 14, 1965

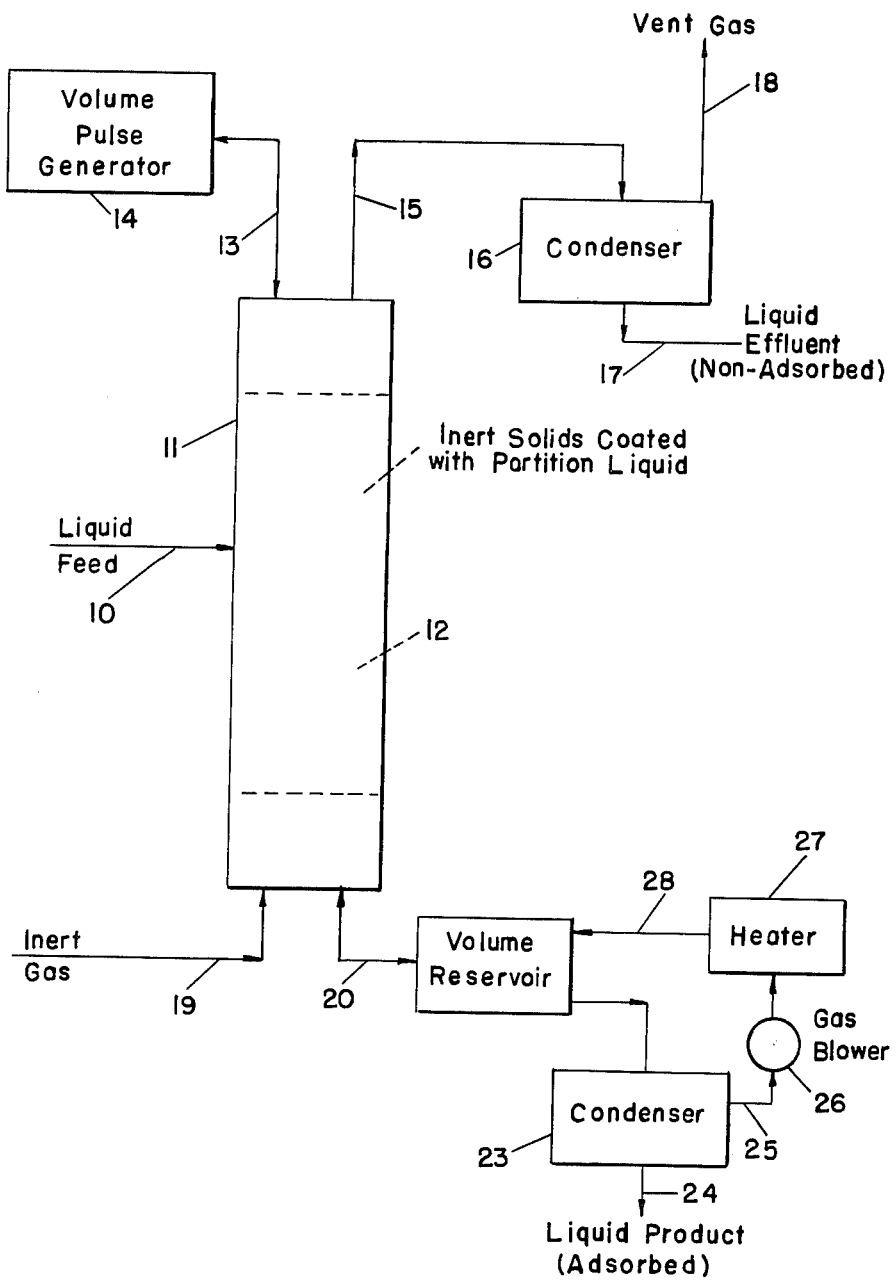

3,223,747
CONTINUOUS FIXED BED VAPOR-LIQUID
PARTITION CHROMATOGRAPH
Byron B. Bohrer, Chester, Pa., assignor to Sun Oil Company, Philadelphia, Pa., a corporation of New Jersey
Filed Aug. 1, 1961, Ser. No. 128,475
6 Claims. (Cl. 260—674)

This invention relates to a method of separating fluid mixtures. It particularly relates to a method of continuously separating fluid mixtures using a fixed bed of partition chromatographic adsorbent.

It is well known in the art that a fluid mixture can be separated, particularly for analytical purposes, by gas-liquid partition chromatography. In such a prior art process, a sample of a relatively volatile fluid mixture to be separated is injected into the end of a narrow column packed with an inert, granular material on which has been deposited a coating of a high-boiling organic liquid such as dioctyl phthalate. The column is then purged or eluted with an inert carrier gas such as helium. The components or fractions of the feed mixture partition between a gas phase in the vapor space and a liquid phase absorbed in the liquid coating on the particles. This partitioning effect causes the components of the mixture to move toward one end of the column with individual component velocities which are less than the velocity of the carrier gas. The relative differences in velocities of the components is dependent upon what is commonly called the component partition coefficient which is defined for purposes of this invention as the ratio of the concentration of the compound in the stationary liquid phase to the concentration of the same component in the moving gas phase. By utilizing the differences in partition coefficients which affect different component velocities, the components of a feed mixture emerge one by one from the column, usually in the order of boiling points for a homologous series. In an analytical procedure, the separated components are detected as they emerge from the partition column by means of a thermal conductivity cell.

It can be noted from the above description that such prior art processes are typically batch operations. However, while batch partition chromatography is useful for analytical purposes, in order for such process to be suitable for practical commercial operation, it is desirable for the separation process to operate continuously. Consequently, the benefits of a continuous process from basically batch operation is frequently achieved by switching the feed material from one battery of adsorbent cases to another in cyclic fashion. Another method of achieving continuous operation is illustrated in United States Patent No. 2,893,955. In such a process, the solid particles coated with a partitioning liquid are continuously moved in cyclic fashion with the feed material and carrier gas introduced into the moving bed of particles at critical points along the cyclic path. The rate of flow of the stream of solid particles is selected in relation to the partition coefficients of components of the feed mixture and in relation to the carrier gas countercurrent flow rate so that one component of the feed mixture of relatively low partition coefficient is caused to move with the carrier gas countercurrently to the direction of flow of the stream of solid particles and another component of higher partition coefficient is caused to move in the opposite direction concurrently with the stream of particles. At appropriate points, the carrier gas and the feed mixture components now separated are withdrawn from the moving stream of solid particles.

It is noted from the above description that, in general, the prior art processes are complex arrangements of vessels and transfer equipment involving considerable expense in construction and maintenance and also involving a considerable amount of "know-how" or process technique in order to optimize operation. This appears true whether the process is batch, e.g., fixed bed, or moving bed process.

The present invention is a simplified partition chromatographic process utilizing a fixed bed of adsorbent wherein the gas phase is systematically pulsed in order to separate components according to their partition coefficient. In other words, in the separation of fluid mixtures by partition chromatography in which a fluid mixture is introduced into a fixed foraminous body of inert solid particles having thereon a liquid coating and through which an inert carrier gas is caused to flow whereby components of said mixture are caused to partition between the liquid coating on said solid particles and the carrier gas, the present invention is based on the improvement which comprises causing the carrier gas to alternately reverse flow direction within the fixed body of solid particles whereby one component of said mixture moves in one direction and is recovered, and another component having a different partition coefficient moves in an opposite direction and is recovered.

The invention may be more fully understood by reference to the accompanying figure which is a schematic flow diagram of one embodiment of the process.

According to my invention, a multi-component feed mixture in liquid phase is fed into an adsorption zone containing a fixed foraminous bed of solid particles coated with a suitable partitioning liquid. The feed is introduced at a point intermediate the ends of the bed of solid particles. An inert carrier gas is introduced into the adsorption zone at a point adjacent an end of the bed. Then, a volume pulse is imposed on the adsorption zone to alternately reverse the directional flow of the gas phase within the bed, thereby moving the component with a particular partition coefficient toward one end of the zone. The component having a different partition coefficient is moved in an opposite direction toward the other end of the zone. The adsorbed component is removed from one end of the zone, and the non-adsorbed component is removed from the other end of the zone. The carrier gas is separated from both components such as by condensation and, preferably, is recycled to the adsorption zone.

In the accompanying drawing, a vertical elongated shell or column 11 is provided as a container or housing for suitable adsorbent 12. As used herein, the term "adsorbent" includes the solid inert particle having coated thereon a suitable partitioning liquid. The solid particles and the partitioning liquid can be any of the materials which are known for use in fixed bed partition chromatographic columns. For example, the solid particles can be granular kieselguhr. The partitioning liquid can be a high-boiling-point, organic solvent such as dinonyl phthalate. The adsorbent is preferably in granular form, e.g., particles of 10 to 200 mesh, and, when placed in column 11, forms a fixed foraminous bed. Volume pulse generator 14 is connected to the adsorber by means of line 13. Volume reservoir 21 is connected to the adsorber through line 20 and is of such a size that during the pulsing operation, the adsorber remains essentially at constant pressure. Condensers 16 and 23 are provided as means for recovering the carrier gas from each product component. Gas blower or compressor 26 and heater 27 are provided to recirculate the carrier gas at the desired temperature.

In the drawing, volume pulse generator 14 is positioned at the top of the adsorber, and the reservoir is placed at the bottom. It is to be understood, however, that generator 14 may be placed at either end of the adsorber with the reservoir 21 and related apparatus placed at the opposite end.

As used herein, the volume pulse generator can be of any type known to the art. Conventionally, the volume generator is a long-stroke piston arrangement such that the stroke of the piston moves the entire body of gas within the adsorbent bed a finite distance which must be less than the length of the adsorption zone. Usually the volume of gas moved is 0.001 to 0.5 times the volume of the adsorption zone. The piston is driven by any suitable power source (not shown) such as an electric motor, gas turbine, reciprocating engine, or the like.

The frequency of pulsation may vary from 10 to 10,000 pulses per minute with the preferred rate between 2,000 and 4,000 pulses per minute. In any event, the rate of pulsation must be below that rate which would cause any movement of the solid particles.

*Example*

As illustrative of a specific embodiment of the operation of the pulsating partition chromatograph, a multicomponent mixture, which it is desired to separate into at least two components such as benzene and n-hexane, in approximately a 1 to 1 volume ratio, is charged through line 10 into adsorber 11 which is filled with 30–60 mesh firebrick coated with silicone oil as the adsorbent. The feed enters the column 11 at 50° C., and the column is maintained at 20 p.s.i.g. pressure. However, in some cases higher pressures or even atmospheric or sub-atmospheric pressures may be desirable. Similarly, it is contemplated that elevated temperatures may be used, e.g., up to 300° C., with satisfactory results in some cases. Those skilled in the art know how to choose the proper temperature and pressure according to the components of the system.

Helium, as the carrier gas, is charged into adsorber 11 via line 19 at a rate sufficient to maintain a pressure of 20 p.s.i.g. within the adsorber. When the carrier gas appears in line 15, the volume pulse generator 14 is started. The piston stroke is set for 0.3 times the volume of adsorbent, and the pulsating rate is set at 2500 pulses per minute.

Since benzene has a relatively low partition coefficient with silicone oil, it is relatively unadsorbed and moves up the column with the main stream of the carrier gas. Further, this separation is indirectly based on the concentration of each component in each phase. Therefore, on the upstroke of the pulse, the gas phase moving up the column becomes richer in benzene. Since the piston stroke is less than the volume of the bed, only carrier gas appears in line 15 at the end of the first pulse.

On the downstroke, carrier gas plus hexane moves into reservoir 21 via line 20. Concurrently, benzene also moves down the column but at a rate less than the rate on the upstroke. Since the partition liquid contains an increasing concentration of hexane, the benzene concentration becomes less. Now, the pulse is repeated, and carrier gas plus hexane move out of reservoir 21 through line 20 and up into column 11. Benzene again moves up the column but for a distance slightly greater than on the preceding stroke. Carrier gas moves into generator 14 via line 13. Therefore, by operating in this stepwise fashion, carrier gas plus a stream substantially enriched in benzene, e.g., 70 percent benzene, ultimately passes through line 15 into condenser 16. Carrier gas is removed via line 18 and, preferably, is recycled to line 19 with fresh inert carrier gas. The benzene-enriched stream is removed via line 17 and sent to storage.

Also, ultimately, relatively pure hexane in carrier gas passes through line 20, through reservoir 21, and into condenser 23 via line 22. Effluent gas is removed via line 25 and passes through blower 26 and heater 27 and back into reservoir 21 via line 28. The function of heater 27 is to supply heat to the gas in order to maintain a temperature gradient between the ends of the adsorption zone. In this specific embodiment, a gradient of 10° C. is maintained. However, in some cases the gradient may be from 2° C. to 100° C. depending upon the function of the chromatograph.

Condensed, relatively pure hexane is removed via line 24 and sent to storage.

While the hereinabove example is directed to separating benzene and hexane, it is to be understood that the process is suitable for other systems amenable to separation by gas-liquid-partition chromatography. The process of the invention is particularly suitable for separating the components of a hydrocarbon mixture of light hydrocarbons such as petroleum fractions of relatively low molecular weight, e.g., $C_{10}$ and lighter hydrocarbons. Petroleum fractions of relatively high molecular weight can also be separated provided operating conditions are such that the components of the feed mixture can be readily vaporized.

Suitable carrier gas can be any inert gaseous material that can be readily separated from the components. Conventional examples include helium, nitrogen, hydrogen, and the like.

According to the present invention, any of the well-known partitioning liquids are useful in the process. For example, suitable partitioning liquids include tricresyl phosphate, silicone oils, paraffin wax, dioctyl phthalate, dinonyl phthalate, dioctyl sebacate, and the like. Mixtures of liquids may also be used such as a mixture of tricresyl phosphate and silicone oil. If the partitioning liquid is volatile, such as water, the carrier gas should be saturated with the vapor of the partitioning liquid so that the liquid will not be removed from the solids by the carrier gas.

Any of the suitable solid materials for partition chromatography may be used in this process. Preferably, the solid is non-porous and is inert (not chromatographically active).

As used herein, the term "partition coefficient" of a compound is defined as the ratio of its concentration in the liquid phase formed as a coating on the solid particles to its concentration in the gas phase formed by the carrier gas flowing through the column. Therefore, what is meant by a compound having a high partition coefficient is one that is more adsorbable in the partitioning liquid than other components of the feed mixture. Conversely, a compound having a low partition coefficient is one that is relatively non-adsorbed in the partitioning liquid and thus tends to remain in the moving gas phase.

I claim:

1. A continuous process for separating a multicomponent mixture of miscible organic liquids into two separate fractions by partition chromatography which comprises (a) continuously feeding a multicomponent mixture of miscible organic liquids into a separation zone containing a fixed foraminous body of solid inert particles having thereon a liquid coating selective for one fraction of said miscible organic liquid mixture;

(b) continuously separating the liquid mixture into two fractions by passing through said separation zone an inert carrier gas which selectively carries the unadsorbed fraction of the miscible liquid mixture to one end of said zone;

(c) imposing a cyclic volume pulse on said zone to alternately reverse the flow direction of the carrier gas within said zone whereby the adsorbed fraction of said zone is selectively moved in the direction countercurrent to that of the carrier gas;

(d) continuously removing from one end of said separation zone the adsorbed fraction of said miscible liquid mixture, and (e) continuously removing from the opposite end of said separation zone carrier gas and the unadsorbed fraction of said miscible liquid mixture.

2. The improvement according to claim 1 wherein the reversal of the direction flow of the carrier gas is effected by a volume pulse of a rate below that rate which would cause any movement of the solid particles.

3. The improvement according to claim 2 wherein said volume pulse is at a rate of from 10 to 10,000 pulses per minute.

4. The improvement according to claim 3 wherein said volume pulse is at a rate of from 2000–4000 pulses per minute.

5. The improvement according to claim 4 wherein a temperature gradient of from 2° C.–100° C. is maintained between the ends of the adsorption zone.

6. The improvement according to claim 1 wherein a temperature gradient of from 2° C.–100° C. is maintained between the ends of the adsorption zone.

References Cited by the Examiner
UNITED STATES PATENTS

| 2,709,643 | 5/1955 | Perry | 210—19 |
| 2,743,818 | 5/1956 | Higuchi | 208—310 |
| 2,808,318 | 10/1957 | Feick | 259—1 |

FOREIGN PATENTS 205,583   1/1957   Australia.

PAUL M. COUGHLAN, *Primary Examiner.*

ALPHONSO D. SULLIVAN, *Examiner.*